March 12, 1974  R. L. AVEY  3,796,656
OIL SLICK REMOVAL METHOD, SYSTEM AND BAG THEREFOR
Filed Dec. 29, 1971  6 Sheets-Sheet 1
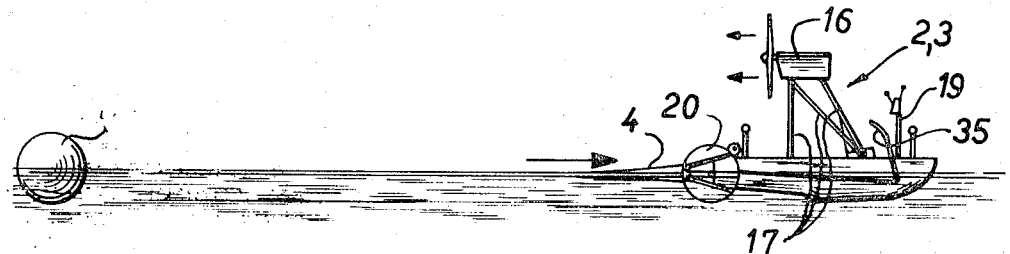
FIG.1
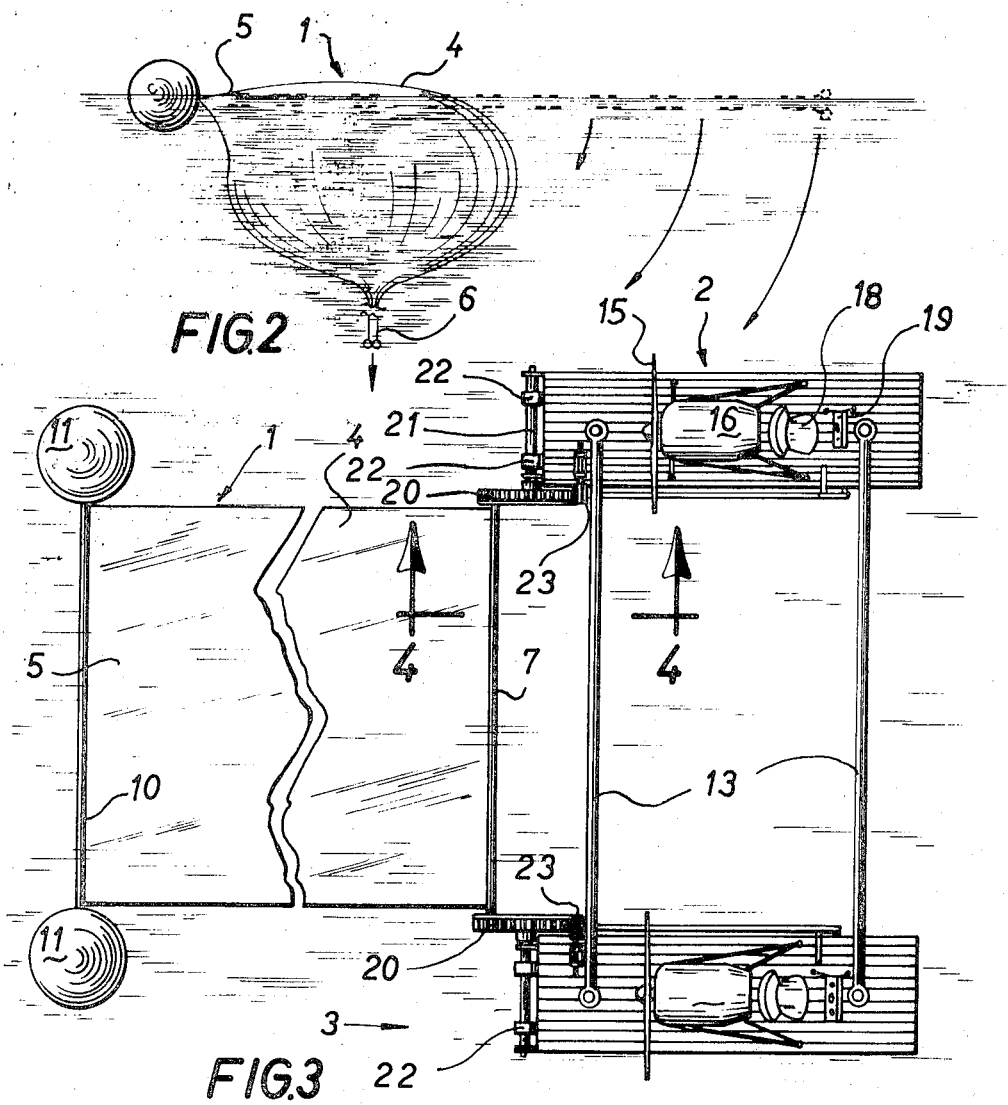
FIG.2
FIG.3

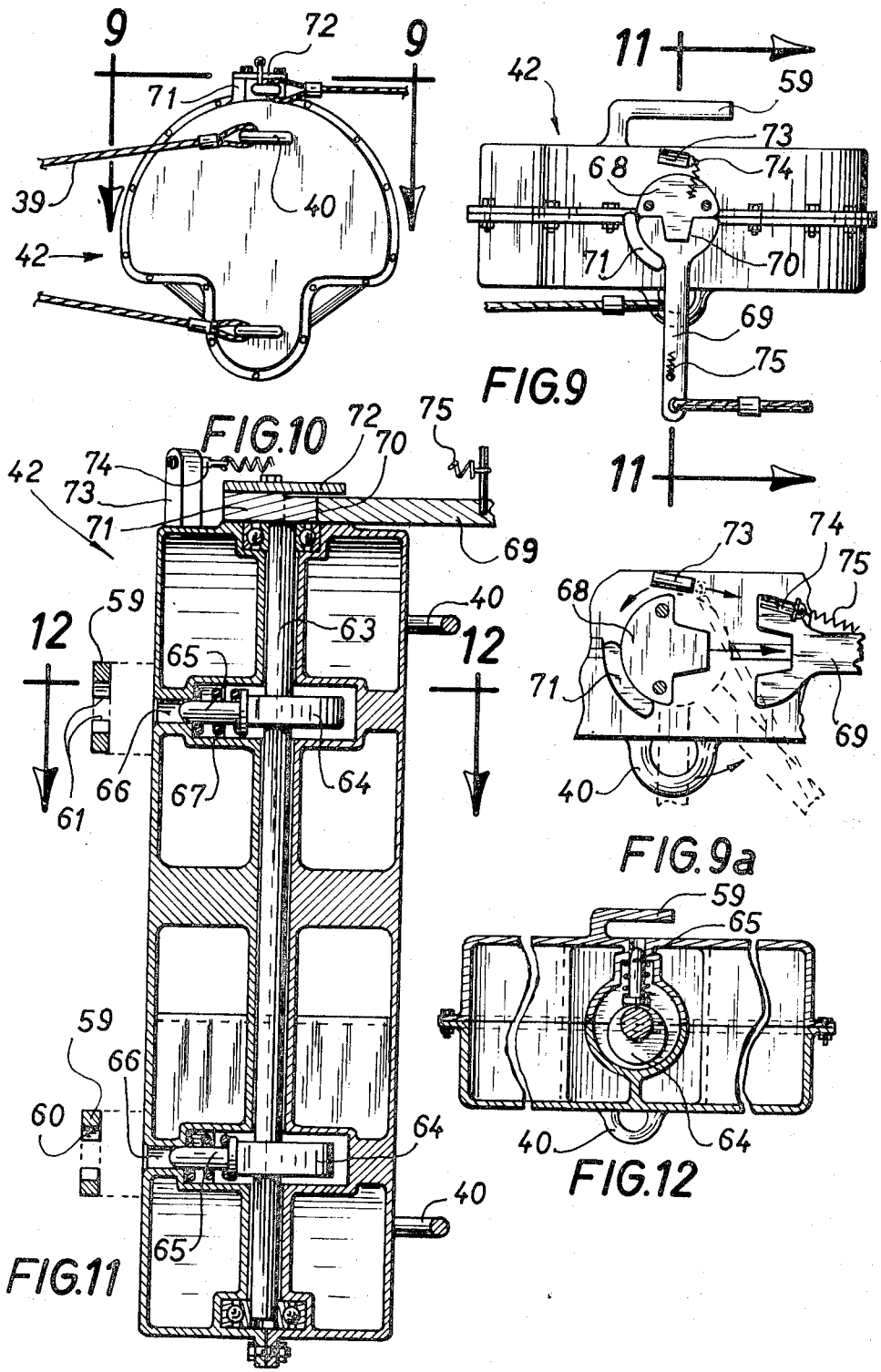

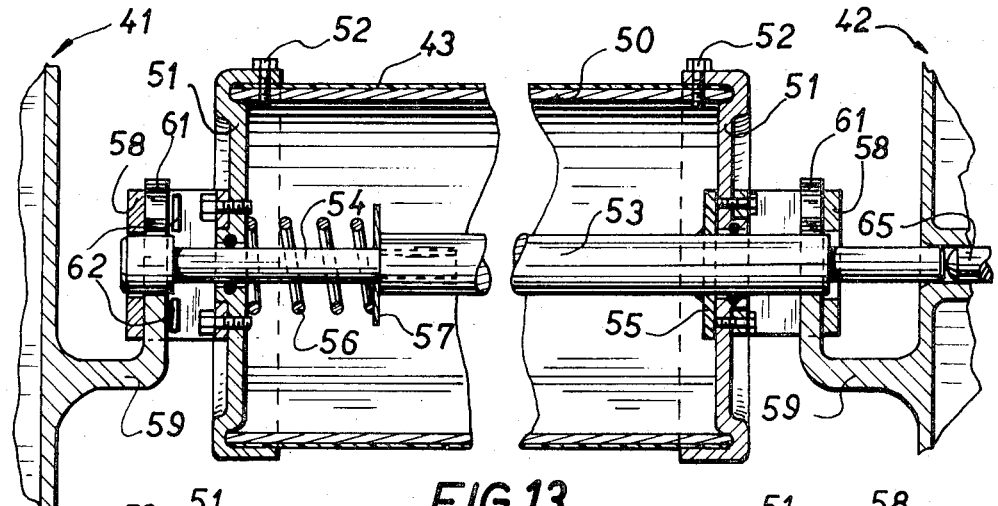
FIG. 13
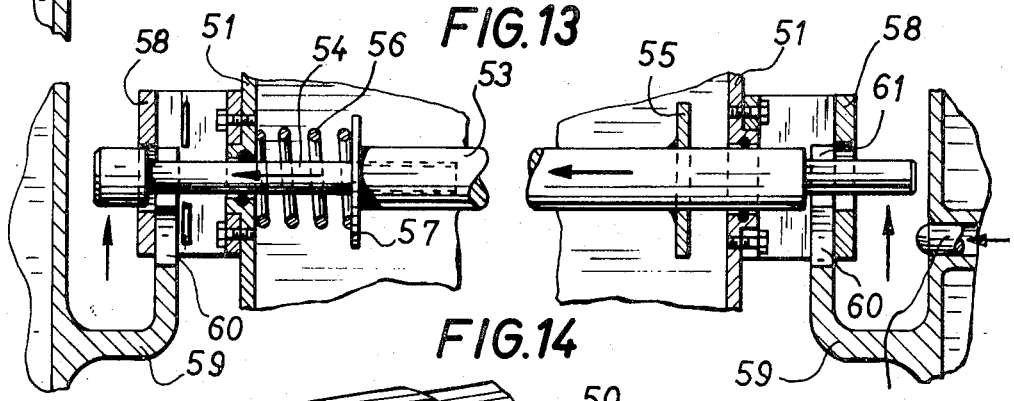
FIG. 14
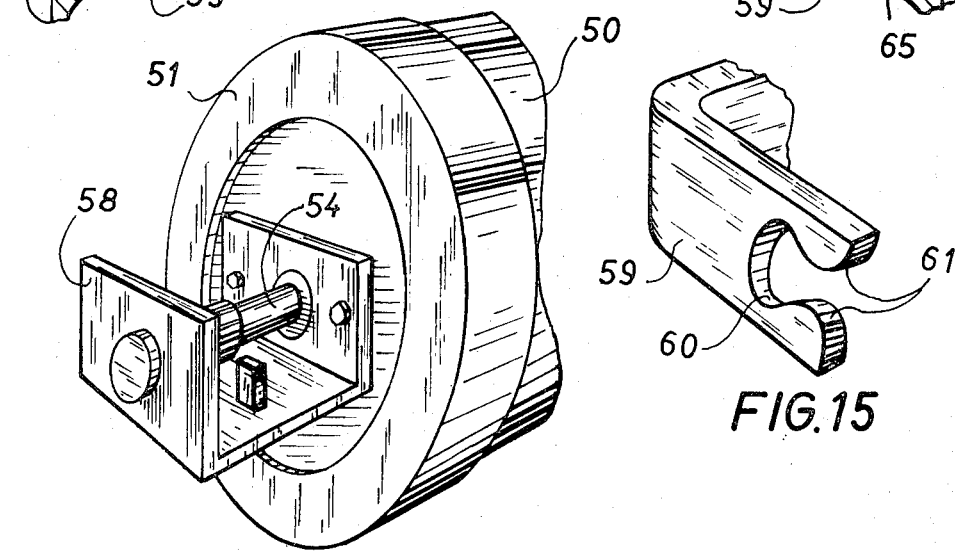
FIG. 16
FIG. 15

United States Patent Office 3,796,656
Patented Mar. 12, 1974

3,796,656
OIL SLICK REMOVAL METHOD, SYSTEM AND
BAG THEREFOR
Reginald L. Avey, 39 Sunny Acres,
Baie d'Urfe, Quebec, Canada
Filed Dec. 29, 1971, Ser. No. 213,668
Int. Cl. B01d 37/00; E02b 15/04
U.S. Cl. 210—65
9 Claims

ABSTRACT OF THE DISCLOSURE

A method for removing an oil slick or other flotage which consists in dragging the open mouth of an initially empty collecting bag in partly immersed position along the surface of a body of water which is covered for instance by an oil slick, to cause the latter to enter into the bag, and to weight and release the open mouth of the bag to allow the same to sink and become suspended from the remainder of the bag. A system adapted to be attached to one or two boats to so drag the mouth of the bag and having releasing and supporting elements adapted to release and allow sinking the mouth of the bag. An oil collecting bag adapted to float while holding collected oil and having a skin constructed of either open mesh material, fabric or film plastic such as to collect oil, with or without being water pervious.

---

This invention relates to the removal of flotage, and more particularly, to oil slick removal methods, systems and bags therefor.

The methods and systems of mechanically removing an oil slick from a body of water, which have been proposed so far, fall into different categories characterized by having one or more of the following features: pumping, wick elements, conveying belts, and/or weirs. The experiment carried out with the above known methods and systems reveals that the latter do not offer a satisfactory weapon to fight water pollution caused by oil spills produced for instance by oil tankers, offshore oil drilling rigs, pipelines, and the like oil handling equipment. Each of the above categories of oil removal concepts has at least one inherent deficiency which seriously impairs the usefulness of that category.

It is a general object of the invention to provide a new and different category of oil removal concept to avoid the above mentioned inherent deficiencies.

It is another general object of the invention to provide an oil removal method and system which can be operated under a wider range of sea conditions than so far known methods and systems.

It is a more specific object of the invention to provide an oil removal method and system which may be readily used in conjunction with already available boats in the area of the oil spill concerned.

It is another object of the invention to provide an oil slick removal equipment which can be easily flown or otherwise transported to the scene of an expected or beginning oil spill to act on the latter as soon as it starts to develop or spread.

It is a further object of the invention to provide oil slick removal equipment which can be mounted on either side of a boat and at different points along the length of the boat.

According to the invention, there are provided large plastic bags, initially rolled on a drum, or otherwise collapsed, which are deployed horizontally so that the bags envelop a strip of oil slick on a body of water. When each bag is fully deployed it is released and the mouth, which is weighted, sinks to the bottom of the body of water, or if the latter is deep enough, the bag floats at the surface with the weighted mouth hanging downwardly into the water. The oil then collects at the uppermost closed end of the bag, where it can be removed, and the bag recovered either for re-use or disposal.

The invention will now be described in details, with reference to the preferred embodiments which are shown, by way of example only, in the accompanying drawings, in which:

FIG. 1 is an elevation view showing a first embodiment of a system according to the invention, in operative position.

FIG. 2 is an elevation view of an oil collecting bag in floating released position.

FIG. 3 is a top view of the system shown in FIG. 1.

FIG. 9 is a top view of a float and associated bag releasing mechanism as seen along line 9—9 in FIG. 10.

FIG. 9a is an enlarged partial view of FIG. 9 illustrating disconnection of the release actuating lever.

FIG. 10 is a side elevation view of the float shown in FIG. 9.

FIG. 11 is a cross-sectional view as seen along line 11—11 in FIG. 9.

FIG. 12 is a cross-sectionl view as seen along line 12—12 in FIG. 11.

FIG. 13 is a longitudinal cross-sectional view of a tube assembly releasably adapted to support the mouth of the oil collecting bag of the second embodiment of the invention.

FIG. 14 is a partial view of FIG. 13 illustrating the tube assembly in releasing condition.

FIG. 15 is a perspective view of part of a bracket adapted to releasably retain the tube assembly of FIGS. 13 and 14.

FIG. 16 is a perspective view of one end of the tube assembly of FIGS. 13 and 14.

Figure 4:
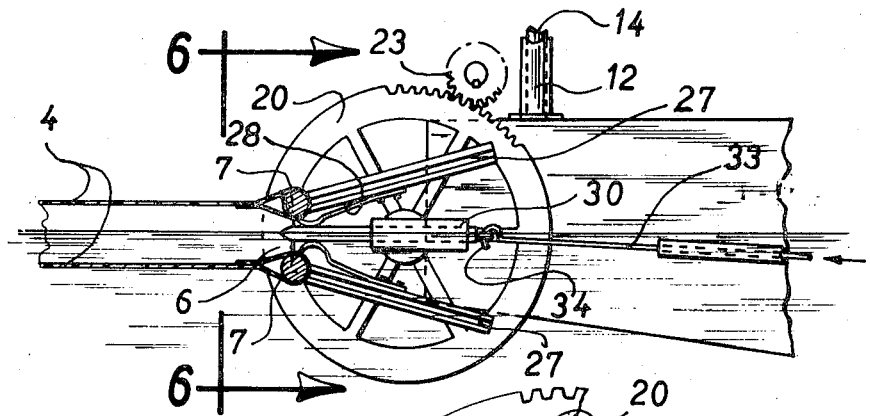
FIG. 4 is a cross-sectional detail view as seen along line 4—4 in FIG. 3.

In the detailed description which follows, the invention is defined as embodied into oil removing systems and bags therefor but, the principle of the invention is also applicable to the removal of other flotage on lakes, rivers, swimming pools and other body or reserve of liquid.

The oil removal system according to the first embodiment of the invention, as shown in FIGS. 1 to 6 inclusive, comprises an oil collecting bag 1 releasably attached to two boats 2 and 3 as and for the purposes hereinafter defined.

The bag 1 comprises a skin 4 defining an oil collecting closed end portion 5 and a full width mouth opening 6 at the other end. Two rods 7 are attached along opposite sides of the mouth opening 6 and extend along each other to form a slender mouth opening. The rods 7 are adapted both to support the mouth of the bag and to form weighting members of sufficient weight to sink the mouth of the oil collecting bag when released into the water. The opposite ends of the rods 7 are provided with pins 8 or the like having an enlarged head portion 9 at the free end thereof, for a purpose which will be better understood hereinafter. The closed end portion 5 is provided with a bar or rod 10 attached transversely thereto and floats 11 of any convenient size and shape arranged to support the enclosed end portion 5 in extended position. The skin 4 of the bag may be made of widely different materials, such as, for instance, a sheet of fabric or plastic of sufficient strength to be self-supported or of less strength but surrounded by a reinforcing net or the like. As an alternative, it is also contemplated to make the skin pervious to water but not to oil by the use of suitable porous or mesh-work material.

Various types of boats may be used, for instance, the boats 2 and 3 are of the flat bottom and overhead powered type, such as the swamp sleds or air boats best shown in FIG. 1. The air boats are proposed as opposed to sea screws for the reasons that they produce less agitation of the oil slick, they have the ability to operate in shallow waters such as close to shore and over reefs and shoals, and the entire system can be carried on the deck of a larger ship. Both boats can be operated by one person only.

Each air boat 2 or 3 is provided with a pair of upstanding tube portions or sleeves 12 fixed endwise on the top of the hull at the front and the rear ends respectively thereof. A pair of spacing bars 13 having a rod 14 pivotally mounted at each end is provided across the boats 2 and 3, with the rods 14 engaging into the sleeves 12 to hold the two boats on spaced apart parallel courses. It will be understood by persons skilled in the art that the spacing bars 13 can be connected in many other suitable ways to the boats 2 or 3. As is well known, each airboat comprises a propeller 15, driven by a motor 16, fixed to a base and supported in elevated position over the hull by a lattice framework 17. Each air boat 2 or 3 further includes a seat 18 and a control column 19.

The illustrated elements provided to support and release the mouth of the oil collecting bag 1 will now be described in details with particular reference to FIGS. 4, 5 and 6. The supporting and releasing devices or assemblies of the two boats are the same except that one is mounted on one side of one boat while the other is mounted on the other side of the other boat such as to support the mouth of the bag 1 intermediate the two boats. It should be appreciated that the components or elements of each supporting and releasing device or assembly are constructed to be interchangeably mounted on one side or the other of either of the two boats 2 and 3. Another point which is worth noting is that the above mentioned devices or assemblies can be mounted at just about any point along the length of the boats without departing from the spirit and scope of the invention.

Each supporting and releasing device comprises preferably a toothed element or gear 20 mounted on a free end of an axle 21 supported by a bracket 22 on the rear portion of the corresponding boat.

A pinion 23 is rotatably supported by an axle 24 retained by a bracket 25 fixed on the top surface of the hull of the boat. A pair of converging guides 26 having a generally C-shape or channel cross-section defining a slot 27 are fixed against the outer side of each gear 20. Each guide 26 is arranged to receive and retain one enlarged head portion 9 of one elongated rod 7. A mechanism, not shown, such as an hydraulic actuator may be associated with the guides 26 and the enlarged head portions 9 to displace the latter along the corresponding guides whereby to vary the width between the two bars 7 and consequently, the width of the slender mouth opening 6.

Each guide 26 is provided with a spring wire 28 having one end fixed thereto, a bulging intermediate portion, and a second end 29 inserted through one end of the corresponding guide 26 to retain an enlarged head portion 9 therein. A plunger casing 30 is fixed on the outer side of the gear 20 and has a plunger 31 slidably mounted therein and arranged to engage the bulging intermediate portions of the two associated spring wires 28 to selectively release the latter and allow the ends 29 to retract and free the enlarged head portions 9 to release the mouth of the bag.

Figure 5:
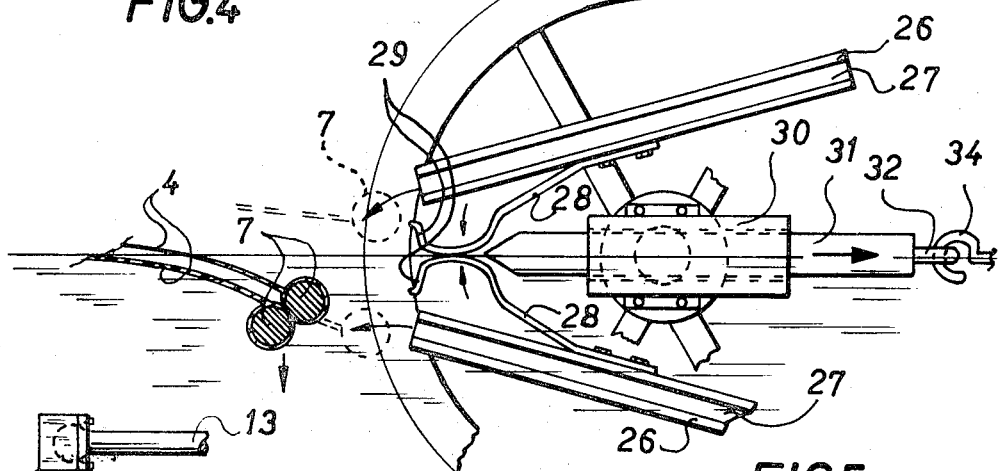
FIG. 5 is a cross-section view corresponding to FIG. 4 but illustrating the operation of a releasing mechanism for the bag.

A hook or eyebolt 32, shown in FIG. 5, is fixed to the end of the plunger 31 and extends away therefrom toward the bow of the boat. A push-pull link 33 having a hook or looped end 34 is slidably mounted along the side of each boat and is operated by a handle 35 to actuate the plunger 31 to either push the ends 29 of the spring wire 28 to retain the enlarged head portions 9 or to release the latter by allowing retraction of the ends 29.

Figure 6:
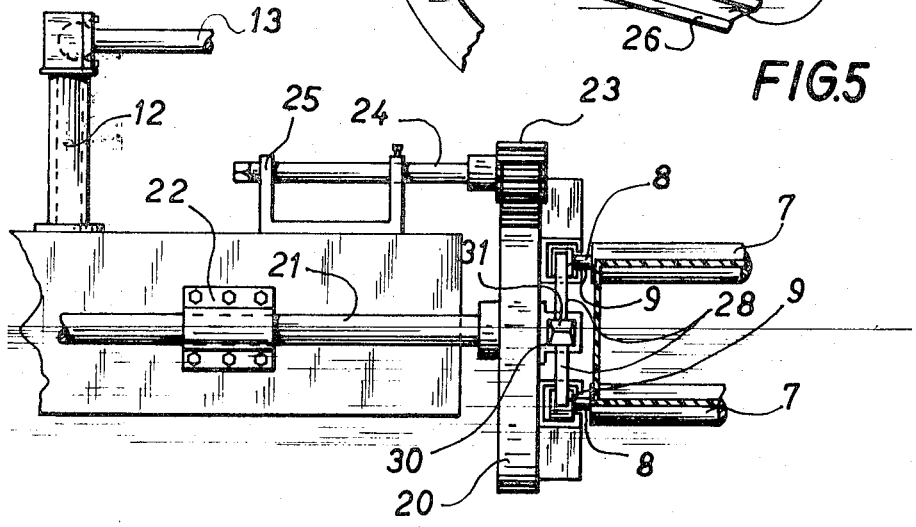
FIG. 6 is a cross-sectional view as seen along line 6—6 in FIG. 4.
Figure 7:
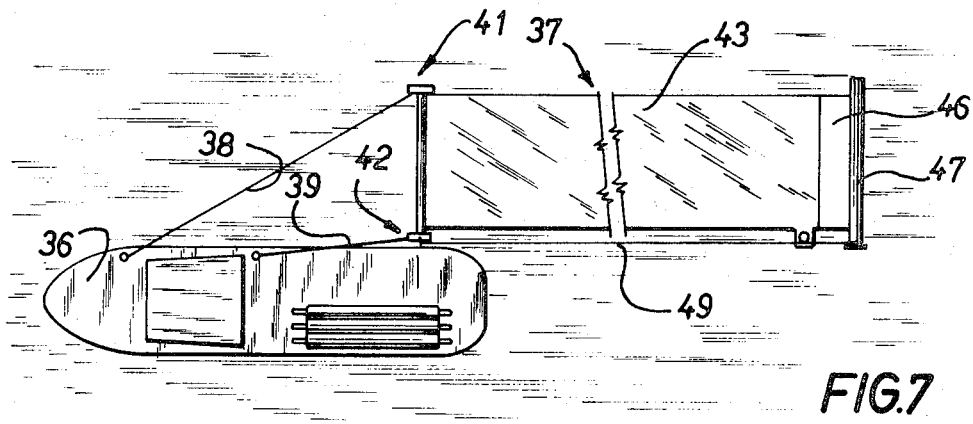
FIG. 7 is a top view of a second embodiment of a system according to the invention.
Figure 8:
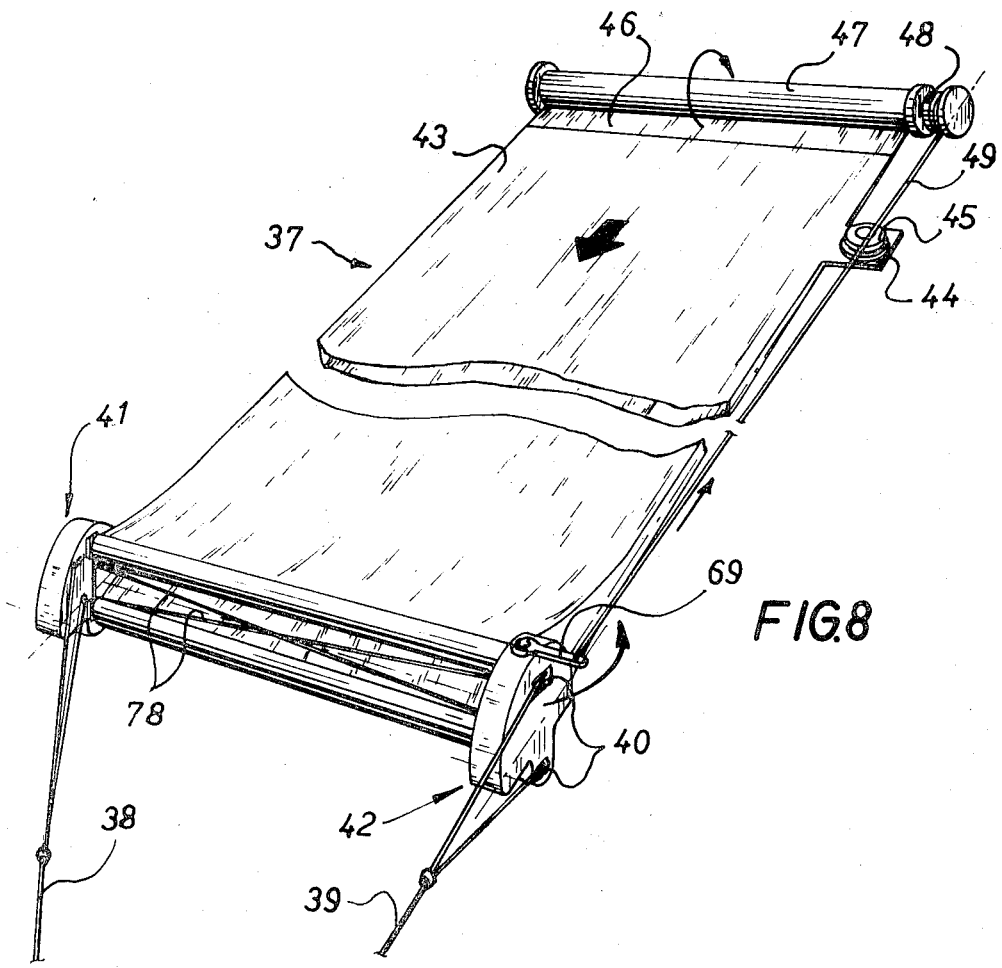
FIG. 8 is a perspective view of the supporting structure and the associated oil collecting bag, shown in FIG. 7.
Figure 17:
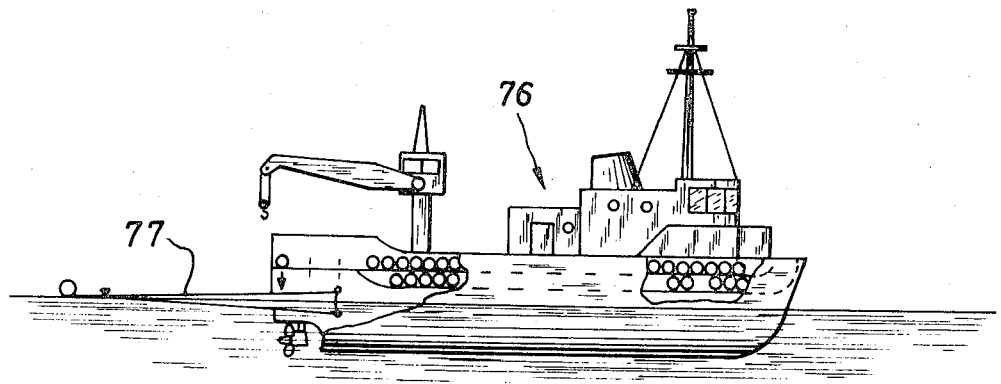
FIG. 17 is a side elevation view, partly broken away, showing a third embodiment of a system according to the invention.
Figure 18:
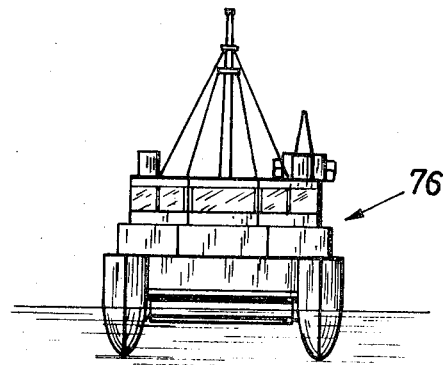
FIG. 18 is a front elevation view of the third embodiment shown in FIG. 17.
Figure 19:
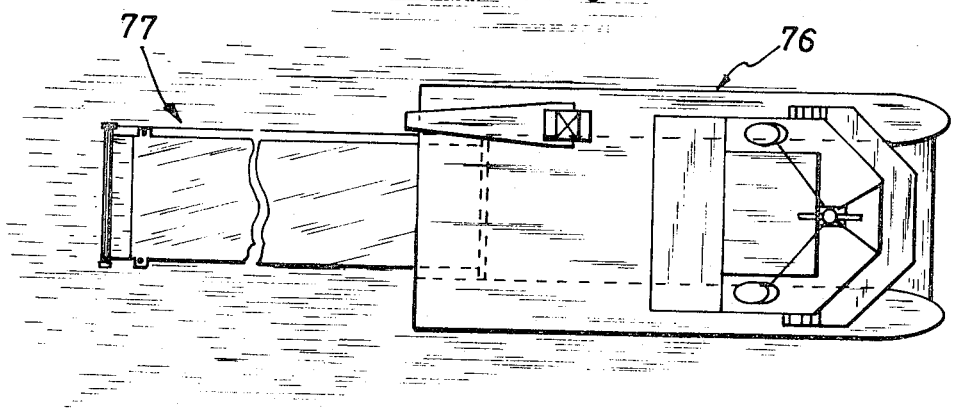
FIG. 19 is a top view of the above third embodiment.

When it is desired to remove an oil slick, tow boats provided with the above-described supporting and releasing devices are coupled together by the spacing rods 13 and an above-described empty oil collecting bag 1 is fixed to the above devices by engaging the enlarged head portions 9 into the guides 26 and by operating the plunger 31 to push the spring ends 29 into retaining position as shown in FIGS. 4 and 6 thereby holding the mouth 6 of the bag in open position.

The gear 20 is then rotated through the pinion 23 by any suitable means to thereby cause the mouth of the bag 1 to be positioned at the desired depth relative to the oil slick. As mentioned earlier, the width of the slender mouth opening 6 may be varied by displacing the bars or rods 7 along the guides 26. After the mouth of the bag has been partly immersed, as above defined, the next step of the method consists in dragging the mouth of the bag in such partly immersed position to cause the oil slick to enter the bag while simultaneously deploying the latter, which is originally collapsed or rolled, without dragging the closed end thereof. This dragging is done by advancing the two boats along parallel courses. Depending on the length of the bag, a more or less long strip of the oil slick will be collected into the bag.

On completion of the run, the operated actuates the releasing plunger 31, allowing the weighted mouth of the bag, whether closed or not, to drop and sink into the body of water. It may be visualized that the weighted mouth of the bag then causes the bag to take an inverted position, as shown in FIG. 2, thereby causing the collected oil to surface over the water into the enclosed end portion 5 of the bag. The operation is then repeated by fixing another bag to the supporting and releasing devices.

The floating bags containing collected oil may then be towed to shore to be emptied or may be provided with a valve outlet to pump the collected oil therefrom into a tanker. Relief or pressure valves could be installed in the floats 11. These could also serve as connecting points for the tanker to pump out the collected oil.

In the second embodiment of the invention illustrated in FIGS. 7 to 16 inclusive, only one boat 36 is used to effect dragging of the open mouth of an oil collecting bag 37 according to a generally similar method as above defined in relation with the first embodiment. The dragging of the bag is done by a pair of drag lines 38, 39 secured to shackle 40 or the like, projecting from one face of a pair of floats 41 and 42. The drag lines 38 and 39 are secured in any appropriate manner to the boat 36.

The oil collecting bag 37 includes a sheet or skin 43 of a suitable material such as polyethylene having a lateral projection 44 for mounting a valve outlet 45 thereon. The bag 37 also includes a tail portion 46 adapted to secure the bag to a floatable drum 47. The latter forms a float to support the closed end of the bag and also forms a spool for rolling the skin 43 thereon. The drum 47 has an extension 48 at one end to which is fixed a releasing cord 49 which is also coiled thereon before deployment of the bag.

A pair of tube assemblies are secured along opposite edges of the mouth of the bag and are adapted to hold the latter open. Each tube assembly, as best shown in FIGS. 13, 14 and 16, includes a tube 50 supporting the edge of the bag 37 and a pair of end flanges 51 secured in any suitable manner, as with screws 52, to the ends of the tube 50. A main rod section 53 extends axially through one end flange 51 and a complementary rod section 54 is screwed axially into the interior end of the main rod section 53 and extends exteriorly through the other end flange 51. Each rod section 53 and 54 includes a larger diameter portion and a smaller diameter portion. The larger diameter portion of the rod section 53 is provided with an annular abutment flange 55 limiting the axial displacement of the rod sections toward the float 42. A spring 56 engages an annular flange 57 on the rod section 53 to bias both rod sections bodily toward the float 42. A U-shaped bracket 58 is fixed against the outer face of each end flange 51, and arranged for projection of the corresponding rod section therethrough.

The float 41 is simply formed into a hollow and sealed body carrying the shackles 40 and brackets 59 adapted to support the adjacent ends of the rod sections 54. The brackets 59 are each provided with an indentation 60 having a narrowed throat portion 61 of suitable width to allow the smaller diameter portions to pass therethrough while preventing passage of the larger diameter portions of the rod sections 53 and 54. The U-shaped brackets 58 adjacent to the float 41 is provided with posts, studs or the like 62 to limit the axial play between that float 41 and the tube assemblies whereby to obtain positive release of the bags, as will be better understood later. Preferably, the posts 62 may be dispensed with by narrowing the U-shaped bracket 58 whereby to obtain the same axial confinement of the brackets 59. The two tube assemblies are joined by diagonal cables 78 so that when the tube assemblies are connected to the two floats a substantially rigid mouth frame is formed.

The float 42 is made of two housing sections sealingly fixed together by screws, bolts, rivets or any other suitable expedient to form a floating hollow body. The float 42 also includes a pair of brackets 59 which are in this case mounted on the opposite face relative to the shackles 40. A shaft 63 is rotatably mounted into the hollow float 42 and extends parallel to the upright alignment of the two brackets 59 of the same float. The shaft 63 carries a pair of cams 64 arranged for bodily rotation therewith and in lateral alignment with the brackets 59. Cam follower plungers 65 are slidably mounted into bores 66 and biased by springs 67 into cam following engagement with the operative surface of the cams 64. As can be seen in FIG. 13, the cam follower plungers 65 are aligned with both rod sections 53 when the bag 37 is in operative position.

A plate 68 is fixed onto the upper end of the shaft 63 and a quick-disconnect lever 69 is operatively connected to the plate 68 by means of a complementarily shaped interface 70. The plate 68 and the quick-disconnect releasing lever 69 are formed with a circular contour adapted to slide along the arc-shaped face of a disconnection-preventing block 71.

A plate 72 is fixed on top of the block 71 and arranged to prevent axial disengagement of the quick-disconnect lever 69. The cable 49 is connected to the outer end of the lever 69. A block or post 73 having a substantially horizontal bore therethrough is mounted onto the top of the float 42 on the opposite side of the shaft 63 relative to the lever 69. The horizontal bore into the post extends generally in the direction of the cable 49 when the latter is unrolled. A pin 74 is normally inserted into the bore of the post 73 and is attached to the lever 69 by a tension spring 75.

According to the method of the invention concerning the second embodiment of the system, a rolled bag 37 is taken from the supply carried by the boat 36, the adjacent ends of the rod sections 54 are engaged into the indentation 60 of the brackets 59 of the romote float 41 and the adjacent ends of the rod sections 53 are similarly engaged into the indentations of the brackets 59 of the near float 42. The tube assemblies are thus supported by the two floats 41 and 42 with the larger diameter portions held captive into the indentations 60 by the narrow throats 61. The drum 47 is dropped and allowed to float behind the tube assemblies and supporting floats. The boat is then displaced forwardly until the bag 37 has completely unrolled from the drum. During that time the partial immersion of the mouth of the bag 37 by the floats 41, 42 has caused the oil slick to collect into the bag. At that point, the cable 47 pulls on the lever 69 and as soon as sufficient force acts thereon, the lever rotates aided by the toggle action of the spring 75, until the end of the lever adjacent to the plate 68 clears the arc-shaped edge of the block 71. Then, the lever 69 is freed and separates from the float 42. The lever 69 also pulls on the pin 74 by action of the spring 75 such that when the latter substantially aligns with the pin 74, the latter becomes disengaged from the post 73, as best shown in FIG. 9a.

Simultaneously, rotation of the shaft 63 and cams 64 causes the control rods 53 and 54 of both upper and lower tube assemblies to move to the position shown in FIG. 14, allowing the tube assemblies to escape from the brackets 59. The mouth of the bag 37, weighted by the tube assemblies, then sinks as in the first embodiment of the invention.

The third embodiment of a system according to the invention illustrates the application of the concept to a larger boat 76 of the catamaran type. Such a boat defines a clear central and upwardly projecting space extending from bow to stern thereof. The mouth of the bag 77, generally similar to the bag 37 but of larger size, is then supported by an appropriate supporting frame, at the stern of the boat in alignment with the above space.

Such boat can be adapted to carry a large supply of bags, with tracks, power operated handling equipment and the like, to facilitate and expedite deployment.

Various changes to the details of construction and in particular to the supporting floats, the tube assemblies, the releasing mechanisms and the quick-disconnect elements, are possible without departing from the principle and scope of the invention as defined in the appended claims.

Obviously, the method according to the principle of the invention may also be practiced by supporting the open mouth of the bag in fixed transversely extending position into a river. This causes dragging of the open mouth of the bag in flotage collecting position and relative displacement thereof along the surface of the river. The closed end of the bag is then floated away from the mouth by the current of the river.

What I claim is:

1. An oil flotage removal system comprising a first and a second support means constructed and arranged to hold the mouth of an oil flotage collecting bag open and partly immersed into a body of liquid which carries said oil flotage, a pair of rigid elongated members of predetermined sinking weight secured to and along opposite sides of said mouth of the bag and having opposite ends releasably carried by said first and said second support means respectively, and operatively extending between the latter respectively under and above the surface of the body of liquid in overlying relationship and lengthwise one to the other, one tow boat connected to said first and second support means and constructed and arranged to tow the latter and to drag the open mouth in the partly immersed condition along the surface of said body of liquid, and releasing mechanisms operatively connected to said first and said second support means and constructed and arranged to release said opposite ends of said pair of elongated members from said first and said second support means to allow sinking of said open mouth of the bag and removal of the collected oil flotage from the body of liquid.

2. A flotage removal system as defined in claim 1, wherein said support means includes a pair of floats adapted to be connected to the opposite ends respectively of said rigid elongated members to floatingly support the latter and the open mouth of the bag.

3. An oil flotage removal system as defined in claim 2, wherein each of said floats includes brackets adapted to support adjacent ends of said rigid elongated members and said releasing mechanisms include an ejecting mechanism mounted onto one of said floats and arranged to cause disengagement of said adjacent ends from said brackets and to free the mouth of the bag from the latter and said floats.

4. An oil flotage removal system as defined in claim 3, further comprising said ejecting mechanism including a lever pivotally mounted onto said one float and a cable attached to said lever and to said bag and arranged to automatically cause said disengagement in response to collection of flotage into said bag, and a dragline attached to each of said floats and to said boat to pull said open mouth along therewith.

5. An oil flotage removal system as defined in claim 1, wherein each of said support means includes an adjustable member having connecting means adapted to hold adjacent ends of said elongated members and constructed and arranged to vary the depth of partial immersion of the mouth of the bag.

6. An oil flotage removal system as defined in claim 5, further including another tow boat rigidly linked to said one boat and forming with the latter a pair of boats arranged to run parallel courses relative to each other, each of said adjustable members being rotatably mounted onto one of said boats about a transverse axis relative thereto, and each of said connecting means includes a pair of converging tracks and a spring element operatively engaging into each of said converging tracks and constructed and arranged to releasably hold a corresponding end of one of said elongated members in engagement with one of said guide tracks, and said releasing mechanism includes a plunger mounted onto each of said adjustable members and constructed and arranged to produce disengagement of said opposite ends of said elongated members from said converging guide tracks to release the mouth of the bag.

7. An oil flotage removal system as defined in claim 1, wherein said one boat constitutes a catamaran boat forming an upwardy projecting cavity extending from bow to stern thereof and said first and said second support means are carried by said catamaran boat on opposite sides respectively of said cavity and support the open mouth of said bag at the stern of said boat and longitudinal alignment with said cavity.

8. A method of removing oil flotage from a body of liquid comprising providing an oil collecting and container bag including a whole bag enclosure formed of a skin of an oil impervious material and having a closed end and an open mouth at the opposite end, partly immersing the open mouth of the oil flotage collecting and container bag into said body of liquid which carries said oil flotage, floating the bag on the body of liquid with the open mouth resting adjacent the closed end, gradually deploying the bag by dragging the open mouth thereof in partly immersed oil flotage collecting position away from the floating closed end until deployment of the bag, stopping dragging of said open mouth before thus dragging the closed end thereof, and then confining the collected oil flotage into the bag without having thus dragged the closed end thereof.

9. An oil collecting bag comprising a skin forming a whole enclosure made of an oil impervious material to collect and contain oil, a closed end having a tail portion, a mouth opening at the opposite end extending substantially the full width of the bag, a floatable drum secured to said tail portion along the outmost transverse edge thereof and constructed and arranged for rolling said skin thereon and to float said closed end, said skin including a lateral projection at said closed end, a valve outlet provided through said lateral projection of said skin in communication with the interior of said enclosure and constructed and arranged to permit pumping the collected oil out of the bag, a releasing cord fixed to said drum and arranged to be coiled thereon and to be used to actuate a releasing mechanism for said open mouth upon full deployment of said skin, and weights secured to said mouth opening and constructed and arranged to hold the latter in open and partly immersed position and to sink said mouth opening upon release of the latter into a body of liquid.

References Cited
UNITED STATES PATENTS

| | | | |
|---|---|---|---|
| 3,289,415 | 12/1966 | Merrill | 61—1 R |
| 3,523,611 | 8/1970 | Fitzgerald | 210—242 |
| 3,219,190 | 11/1965 | Thune | 210—242 |
| 3,508,652 | 4/1970 | Woolley | 210—242 X |
| 3,590,584 | 7/1971 | Fitzgerald | 210—242 |
| 3,653,215 | 4/1972 | Crucet | 210—242 |

FOREIGN PATENTS

| | | | |
|---|---|---|---|
| 590,252 | 1/1960 | Canada | 210—169 |

SAMIH N. ZAHARNA, Primary Examiner

T. A. GRANGER, Assistant Examiner

U.S. Cl. X.R.

210—DIG. 21, 242